US011677328B2

(12) United States Patent
Liu et al.

(10) Patent No.: US 11,677,328 B2
(45) Date of Patent: Jun. 13, 2023

(54) CONVERTER AND POWER SUPPLY SYSTEM WITH SIMPLIFIED SAMPLING

(71) Applicant: Huawei Digital Power Technologies Co., Ltd., Shenzhen (CN)

(72) Inventors: Weiping Liu, Dongguan (CN); Yongtao Liang, Dongguan (CN); Chen Chen, Dongguan (CN)

(73) Assignee: Huawei Digital Power Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/481,076

(22) Filed: Sep. 21, 2021

(65) Prior Publication Data
US 2022/0038025 A1    Feb. 3, 2022

Related U.S. Application Data

(63) Continuation of application No. PCT/CN2020/093978, filed on Jun. 2, 2020.

(30) Foreign Application Priority Data

Aug. 7, 2019  (CN) .......................... 201910725682.5

(51) Int. Cl.
*H02M 7/219* (2006.01)
*H02M 7/5387* (2007.01)
*H02M 1/10* (2006.01)

(52) U.S. Cl.
CPC ............. *H02M 7/219* (2013.01); *H02M 1/10* (2013.01); *H02M 7/5387* (2013.01)

(58) Field of Classification Search
CPC ........ H02M 1/32; H02M 7/219; H02M 7/217; H02M 7/797; H02M 7/66; Y02B 70/10; B60L 53/22; B60L 2210/30; B60L 55/00
See application file for complete search history.

(56) References Cited

U.S. PATENT DOCUMENTS 8,687,388 B2 *  4/2014  Jang ..................... H02M 1/4216
                                                         363/44
11,177,682 B2 * 11/2021  Chang .................... H02M 1/10
(Continued)

FOREIGN PATENT DOCUMENTS

CN         102570560 A      7/2012
CN         205986277 U      2/2017
(Continued)

OTHER PUBLICATIONS

Langmaack N et al.: "Transformerless Onboard Charger for Electric Vehicles with 800 V Power System", 2019 IEEE 13th International Conference on Power Electronics and Drive Systems (PEDS), IEEE, Jul. 9, 2019, XP033719327, Total 5 Pages.

*Primary Examiner* — Gustavo A Rosario-Benitez
(74) *Attorney, Agent, or Firm* — Gregg L. Jansen

(57) ABSTRACT

A converter and a power supply system are disclosed, and relate to the power electronics field, to resolve a problem that a sampling circuit in an OBC circuit is relatively complex. The converter includes an alternating current unit, a switching unit, a conversion unit, a direct current unit, and a controller. The alternating current unit includes a U line, a V line, a W line, and an N line. The N line is connected to a ground of the controller, so that the controller can be directly connected to the U line, the V line, and the W line, to collect a voltage of the U line, a voltage of the V line, and a voltage of the W line. This simplifies the sampling circuit.

12 Claims, 7 Drawing Sheets

(56) References Cited

U.S. PATENT DOCUMENTS

| | | | |
|---|---|---|---|
| 2006/0226130 A1* | 10/2006 | Kooken | H02M 1/4225 |
| | | | 219/130.1 |
| 2013/0027991 A1 | 1/2013 | Gaknoki et al. | |
| 2013/0181646 A1* | 7/2013 | Takata | H02M 7/219 |
| | | | 318/400.29 |
| 2014/0198542 A1* | 7/2014 | Swamy | H02M 1/4225 |
| | | | 363/126 |
| 2014/0217827 A1* | 8/2014 | Cheek | H02J 3/381 |
| | | | 307/64 |
| 2016/0159228 A1* | 6/2016 | Tang | B60L 53/16 |
| | | | 307/10.1 |
| 2017/0237373 A1* | 8/2017 | Tabuchi | H02P 9/08 |
| | | | 322/79 |
| 2019/0184833 A1 | 6/2019 | Elshaer et al. | |
| 2020/0023746 A1* | 1/2020 | Kim | H02M 1/4216 |
| 2020/0083727 A1* | 3/2020 | Sun | H02J 7/00 |

FOREIGN PATENT DOCUMENTS

| | | |
|---|---|---|
| CN | 207124568 U | 3/2018 |
| CN | 108258697 A | 7/2018 |
| CN | 109842287 A | 6/2019 |
| CN | 109889077 A | 6/2019 |
| CN | 110460260 A | 11/2019 |

\* cited by examiner

CONVERTER AND POWER SUPPLY SYSTEM WITH SIMPLIFIED SAMPLING

CROSS-REFERENCE TO RELATED APPLICATIONS

This application is a continuation of International Application No. PCT/CN2020/093978, filed on Jun. 2, 2020, which claims priority to Chinese Patent Application No. 201910725682.5, filed on Aug. 7, 2019. The disclosures of the aforementioned applications are hereby incorporated by reference in their entireties.

TECHNICAL FIELD

This application relates to the power electronics field, and in particular, to a converter and a power supply system.

BACKGROUND

Electric vehicles develop rapidly. However, direct current fast charging infrastructures have not been popularized at present. This affects user experience of the electric vehicles. To facilitate charging, an electric vehicle is equipped with an on-board charger (OBC), so that the electric vehicle can be charged by using a household alternating current power socket. For example, the electric vehicle may be charged by using a three-phase alternating current or a single-phase alternating current. Compared with the single-phase alternating current, the three-phase alternating current can improve a charging power level, shorten a charging time, and increase an endurance mileage of the electric vehicle. To improve user experience of the electric vehicle, an inverter function may become a standard configuration of the electric vehicle. Vehicle-to-vehicle (V2V) power supply and vehicle-to-load (V2L) power supply can be implemented by using an inverter technology. For example, the electric vehicle can provide a three-phase alternating current and a single-phase alternating current for a load by using the OBC.

To enable a controller to control, based on an alternating current voltage, an OBC circuit to work in a three-phase rectified state/a three-phase inverted state or in a single-phase rectified state/a single-phase inverted state, the OBC circuit usually includes a sampling circuit. The sampling circuit is used by the controller to collect an alternating current voltage of the OBC. However, in a conventional technology, a negative electrode of a bus is a ground, and the sampling circuit needs to include a differential circuit. Consequently, the sampling circuit is relatively complex.

SUMMARY

This application provides a converter and a power supply system, to resolve a problem that a sampling circuit in an OBC circuit is relatively complex.

To achieve the foregoing objective, the following technical solutions are adopted in this application:

In some embodiments (sometimes referred to as, "a first aspect"), a converter is provided. The converter includes an alternating current input unit, a switching unit, a conversion unit, a direct current output unit, and a controller. The alternating current input unit is configured (e.g., initialized, arranged) to input an alternating current to provide the alternating current for the conversion unit. The alternating current input unit includes a U line, a V line, a W line, and/or an N line. The N line is connected to a ground of the controller. An output end of the alternating current input unit is connected to an input end of the switching unit. The controller is configured to: collect a voltage of the U line by using a first sampling line, collect a voltage of the V line by using a second sampling line, collect a voltage of the W line by using a third sampling line, determine (e.g., identify, define) a first control signal based on at least one of the voltage of the U line, the voltage of the V line, and the voltage of the W line, and/or send the first control signal to the switching unit. The controller is connected to the U line through the first sampling line, the controller is connected to the V line through the second sampling line, and the controller is connected to the W line through the third sampling line. The switching unit is configured to control (e.g., operate, activate), based on the first control signal sent by the controller, the converter to switch from a three-phase alternating current input circuit to a single-phase alternating current input circuit. An output end of the switching unit is connected to an input end of the conversion unit. The conversion unit is configured to convert (e.g., transform) the alternating current into a direct current based on a second control signal sent by the controller. The second control signal is determined based on at least one of the voltage of the U line, the voltage of the V line, and/or the voltage of the W line that are collected by the controller, a current of the conversion unit, and/or a direct current voltage output by the direct current output unit. An output end of the conversion unit is connected to an input end of the direct current output unit. The direct current output unit is configured to: receive (e.g., obtain, acquire, retrieve) the direct current output by the conversion unit, and output the direct current.

In the converter provided in this embodiment of this application, the N line is connected to the ground of the controller and is used as a sampling reference ground of the controller. Therefore, the controller can be separately connected to the U line, the V line, and the W line directly, to collect the voltage of the U line, the voltage of the V line, and/or the voltage of the W line. This effectively simplifies a three-phase voltage sampling circuit.

In some embodiments, the converter further includes a first bus split capacitor and/or a second bus split capacitor. A middle point between the first bus split capacitor and the second bus split capacitor is connected to the N line through a capacitor. A positive electrode of the first bus split capacitor is connected to a positive electrode of a bus included in the direct current output unit, a negative electrode of the first bus split capacitor is connected to a positive electrode of the second bus split capacitor, and a negative electrode of the second bus split capacitor is connected to a negative electrode of the bus included in the direct current output unit. In this way, a high-frequency path can be provided, thereby reducing electromagnetic interference (EMI).

In some embodiments, the conversion unit includes a first inductor, a second inductor, a third inductor, a first switching transistor, a second switching transistor, a third switching transistor, a fourth switching transistor, a fifth switching transistor, and/or a sixth switching transistor. One end of the first inductor is connected to the U line, and the other end of the first inductor is connected to a middle point of a bridge arm formed by connecting the first switching transistor and the second switching transistor in series. One end of the second inductor is connected to the V line, and the other end of the second inductor is connected to a middle point of a bridge arm formed by connecting the third switching transistor and the fourth switching transistor in series. One end of the third inductor is connected to the W line, and the other end of the third inductor is connected to a middle point of a bridge arm formed by connecting the fifth switching transistor and the sixth switching transistor in series. A drain of the first switching transistor, a drain of the third switching transistor, and a drain of the fifth switching transistor are all connected to the positive electrode of the bus included in the direct current output unit. A drain of the second switching transistor, a drain of the fourth switching transistor, and a source of the sixth switching transistor are all connected to the negative electrode of the bus included in the direct current output unit.

In some embodiments, the controller is further configured to: collect a current of the first inductor by using a fourth sampling line, collect a current of the second inductor by using a fifth sampling line, collect a current of the third inductor by using a sixth sampling line, collect the direct current voltage by using a seventh sampling line, determine the second control signal based on at least one of the current of the first inductor, the current of the second inductor, the current of the third inductor, the direct current voltage, the voltage of the U line, the voltage of the V line, and the voltage of the W line, and/or send the second control signal to the conversion unit. In this way, the N line is connected to the ground of the controller and is used as a sampling reference ground of the controller. Therefore, the controller can be separately connected to the U line, the V line, and the W line directly, to collect the current of the first inductor, the current of the second inductor, and the current of the third inductor. This effectively simplifies a current sampling circuit of the conversion unit.

In some embodiments, the first inductor, the second inductor, and the third inductor are integrated inductors. Therefore, when the converter works in a three-phase alternating current rectified state, a power frequency magnetic flux can be canceled and volumes of the inductors can be reduced.

In some embodiments, the switching unit includes a first switch, a second switch, and a third switch. One end of the first switch is connected to the V line, the other end of the first switch is connected to the N line, one end of the second switch is connected to the W line, the other end of the second switch is connected to the N line, one end of the third switch is connected to one end of the first inductor, and the other end of the third switch is connected to the other end of the first inductor. The first switch is configured to control, based on the first control signal sent by the controller, the first switch to be closed. The second switch is configured to control, based on the first control signal sent by the controller, the second switch to be closed. The third switch is configured to control, based on the first control signal sent by the controller, the third switch to be closed.

In some embodiments (sometimes referred to as, "a second aspect"), a converter is provided. The converter includes a direct current input unit, a switching unit, a conversion unit, an alternating current output unit, and a controller. The direct current input unit is configured to input a direct current to provide the direct current for the conversion unit. An output end of the direct current input unit is connected to an input end of the conversion unit. The conversion unit is configured to convert the direct current into an alternating current based on a first control signal sent by the controller. The first control signal is determined based on at least one of a voltage of a U line, a voltage of a V line, and a voltage of a W line that are collected by the controller, a current of the conversion unit, and a direct current voltage output by the direct current input unit. An output end of the conversion unit is connected to an input end of the switching unit. The switching unit is configured to control, based on a second control signal sent by the controller, the converter to switch from a three-phase alternating current output circuit to a single-phase alternating current output circuit. An output end of the switching unit is connected to an input end of the alternating current output unit. The alternating current output unit is configured to: receive the alternating current output by the conversion unit, and output the alternating current. The alternating current output unit includes the U line, the V line, the W line, and/or an N line. The N line is connected to a ground of the controller. The controller is configured to: collect the voltage of the U line by using a first sampling line, collect the voltage of the V line by using a second sampling line, collect the voltage of the W line by using a third sampling line, determine the second control signal based on at least one of the voltage of the U line, the voltage of the V line, and the voltage of the W line, and/or send the second control signal to the switching unit. The controller is connected to the U line through the first sampling line, the controller is connected to the V line through the second sampling line, and the controller is connected to the W line through the third sampling line.

In the converter provided in this embodiment of this application, the N line is connected to the ground of the controller and is used as a sampling reference ground of the controller. Therefore, the controller can be separately connected to the U line, the V line, and the W line directly, to collect the voltage of the U line, the voltage of the V line, and the voltage of the W line. This effectively simplifies a three-phase voltage sampling circuit.

In some embodiments, the converter further includes a first bus split capacitor and a second bus split capacitor. A middle point between the first bus split capacitor and the second bus split capacitor is connected to the N line through a capacitor. A positive electrode of the first bus split capacitor is connected to a positive electrode of a bus included in the direct current input unit, a negative electrode of the first bus split capacitor is connected to a positive electrode of the second bus split capacitor, and a negative electrode of the second bus split capacitor is connected to a negative electrode of the bus included in the direct current input unit. In this way, a high-frequency path can be provided, thereby reducing EMI.

In some embodiments, the conversion unit includes a first inductor, a second inductor, a third inductor, a first switching transistor, a second switching transistor, a third switching transistor, a fourth switching transistor, a fifth switching transistor, and a sixth switching transistor. One end of the first inductor is connected to the U line, and the other end of the first inductor is connected to a middle point of a bridge arm formed by connecting the first switching transistor and the second switching transistor in series. One end of the second inductor is connected to the V line, and the other end of the second inductor is connected to a middle point of a bridge arm formed by connecting the third switching transistor and the fourth switching transistor in series. One end of the third inductor is connected to the W line, and the other end of the third inductor is connected to a middle point of a bridge arm formed by connecting the fifth switching transistor and the sixth switching transistor in series. A drain of the first switching transistor, a drain of the third switching transistor, and a drain of the fifth switching transistor are all connected to the positive electrode of the bus included in the direct current input unit. A drain of the second switching transistor, a drain of the fourth switching transistor, and a source of the sixth switching transistor are all connected to the negative electrode of the bus included in the direct current input unit.

In some embodiments, the controller is further configured to: collect a current of the first inductor by using a fourth sampling line, collect a current of the second inductor by using a fifth sampling line, collect a current of the third inductor by using a sixth sampling line, collect the direct current voltage by using a seventh sampling line, determine the first control signal based on at least one of the current of the first inductor, the current of the second inductor, the current of the third inductor, the direct current voltage, the voltage of the U line, the voltage of the V line, and the voltage of the W line, and/or send the first control signal to the conversion unit. In this way, the N line is connected to the ground of the controller and is used as a sampling reference ground of the controller. Therefore, the controller can be separately connected to the U line, the V line, and the W line directly, to collect the current of the first inductor, the current of the second inductor, and the current of the third inductor. This simplifies a current sampling circuit of the conversion unit.

In some embodiments, the first inductor, the second inductor, and the third inductor are integrated inductors. Therefore, when the converter works in a three-phase alternating current rectified state, a power frequency magnetic flux can be canceled and volumes of the inductors can be reduced.

In some embodiments, the switching unit includes a first switch, a second switch, and a third switch. One end of the first switch is connected to the V line, the other end of the first switch is connected to the N line, one end of the second switch is connected to the W line, the other end of the second switch is connected to the N line, one end of the third switch is connected to one end of the first inductor, and the other end of the third switch is connected to the other end of the first inductor. The first switch is configured to control, based on the second control signal sent by the controller, the first switch to be closed. The second switch is configured to control, based on the second control signal sent by the controller, the second switch to be closed. The third switch is configured to control, based on the second control signal sent by the controller, the third switch to be closed.

In some embodiments (sometimes referred to as, "a third aspect"), a converter is provided. The converter includes an alternating current input unit, a switching unit, a conversion unit, and a direct current output unit. The alternating current input unit is configured to input an alternating current to provide the alternating current for the conversion unit. The alternating current input unit includes a U line, a V line, a W line, and/or an N line. An output end of the alternating current input unit is connected to an input end of the switching unit. The switching unit is configured to switch the converter from a three-phase alternating current input circuit to a single-phase alternating current input circuit. An output end of the switching unit is connected to an input end of the conversion unit. The conversion unit is configured to convert the alternating current into a direct current. An output end of the conversion unit is connected to an input end of the direct current output unit. The direct current output unit is configured to: receive the direct current output by the conversion unit, and output the direct current.

The conversion unit includes a first inductor, a second inductor, a third inductor, a first switching transistor, a second switching transistor, a third switching transistor, a fourth switching transistor, a fifth switching transistor, and a sixth switching transistor. One end of the first inductor is connected to the U line, and the other end of the first inductor is connected to a middle point of a bridge arm formed by connecting the first switching transistor and the second switching transistor in series. One end of the second inductor is connected to the V line, and the other end of the second inductor is connected to a middle point of a bridge arm formed by connecting the third switching transistor and the fourth switching transistor in series. One end of the third inductor is connected to the W line, and the other end of the third inductor is connected to a middle point of a bridge arm formed by connecting the fifth switching transistor and the sixth switching transistor in series. A drain of the first switching transistor, a drain of the third switching transistor, and a drain of the fifth switching transistor are all connected to a positive electrode of a bus included in the direct current output unit. A drain of the second switching transistor, a drain of the fourth switching transistor, and a source of the sixth switching transistor are all connected to a negative electrode of the bus included in the direct current output unit.

The switching unit includes a first switch, a second switch, and a third switch. One end of the first switch is connected to the V line, the other end of the first switch is connected to the N line, one end of the second switch is connected to the W line, the other end of the second switch is connected to the N line, one end of the third switch is connected to one end of the first inductor, and the other end of the third switch is connected to the other end of the first inductor. When the first switch, the second switch, and the third switch are all closed, the converter is switched to the single-phase alternating current input circuit.

In the converter provided in this embodiment of this application, when the converter inputs a single-phase alternating current, closing the first switch S1 and the second switch S2 enables phase power bridge arms of the V line and the W line to work in parallel, to fully utilize a power device, reduce losses of the switching transistors, and improve rectification efficiency; and closing the third switch S3 enables a bridge arm connected to the third switch S3 to work at a low frequency, to be compatible with a circuit structure of the conversion unit.

In some embodiments (sometimes referred to as, "a fourth aspect"), a converter is provided.

The converter includes a direct current input unit, a switching unit, a conversion unit, and an alternating current output unit. The direct current input unit is configured to input a direct current to provide the direct current for the conversion unit. An output end of the direct current input unit is connected to an input end of the conversion unit. The conversion unit is configured to convert the direct current into an alternating current. An output end of the conversion unit is connected to an input end of the switching unit. The switching unit is configured to switch the converter from a three-phase alternating current output circuit to a single-phase alternating current output circuit. An output end of the switching unit is connected to an input end of the alternating current output unit. The alternating current output unit is configured to: receive the alternating current output by the conversion unit, and output the alternating current. The alternating current output unit includes a U line, a V line, a W line, and/or an N line.

The conversion unit includes a first inductor, a second inductor, a third inductor, a first switching transistor, a second switching transistor, a third switching transistor, a fourth switching transistor, a fifth switching transistor, and a sixth switching transistor. One end of the first inductor is connected to the U line, and the other end of the first inductor is connected to a middle point of a bridge arm formed by connecting the first switching transistor and the second switching transistor in series. One end of the second inductor is connected to the V line, and the other end of the second inductor is connected to a middle point of a bridge arm formed by connecting the third switching transistor and the fourth switching transistor in series. One end of the third inductor is connected to the W line, and the other end of the third inductor is connected to a middle point of a bridge arm formed by connecting the fifth switching transistor and the sixth switching transistor in series. A drain of the first switching transistor, a drain of the third switching transistor, and a drain of the fifth switching transistor are all connected to a positive electrode of a bus included in the direct current input unit. A drain of the second switching transistor, a drain of the fourth switching transistor, and a source of the sixth switching transistor are all connected to a negative electrode of the bus included in the direct current input unit.

The switching unit includes a first switch, a second switch, and a third switch. One end of the first switch is connected to the V line, the other end of the first switch is connected to the N line, one end of the second switch is connected to the W line, the other end of the second switch is connected to the N line, one end of the third switch is connected to one end of the first inductor, and the other end of the third switch is connected to the other end of the first inductor. When the first switch, the second switch, and the third switch are all closed, the converter is switched to the single-phase alternating current output circuit.

In the converter provided in this embodiment of this application, when the converter outputs a single-phase alternating current, closing the first switch S1 and the second switch S2 enables phase power bridge arms of the V line and the W line to work in parallel, to fully utilize a power device, reduce losses of the switching transistors, and improve rectification efficiency; and closing the third switch S3 enables a bridge arm connected to the third switch S3 to work at a low frequency, to be compatible with a circuit structure of the conversion unit.

In some embodiments (sometimes referred to as, "a fifth aspect"), a power supply system is provided, including a load and at least one of any of the foregoing converters. The converter is configured to: convert an alternating current into a direct current, to provide the direct current for the load; or convert a direct current into an alternating current, to provide the alternating current for the load.

In addition, for technical effects of designs of any of the foregoing aspects, refer to the technical effects of the different designs in the first aspect and the second aspect. Details are not described herein again.

In this application, the name "converter" constitutes no limitation on devices. In actual implementation, these devices may have other names. Such devices fall within the scope of the claims of this application and their equivalent technologies, provided that functions of the devices are similar to those in this application.

DESCRIPTION OF EMBODIMENTS

In the specification, claims, and accompanying drawings of this application, terms such as "first", "second", and "third" are intended to distinguish between different objects but not to limit a particular order.

In the embodiments of this application, the word "example" or "for example" is used to represent giving an example, an illustration, or a description. Any embodiment or design scheme described as "example" or "for example" in the embodiments of this application should not be explained as being more preferred or having more advantages than another embodiment or design scheme. Exactly, use of the word "example" or "for example" is intended to present a relative concept in a specific manner.

The following describes implementations of the embodiments of this application in detail with reference to accompanying drawings.

Figure 1:
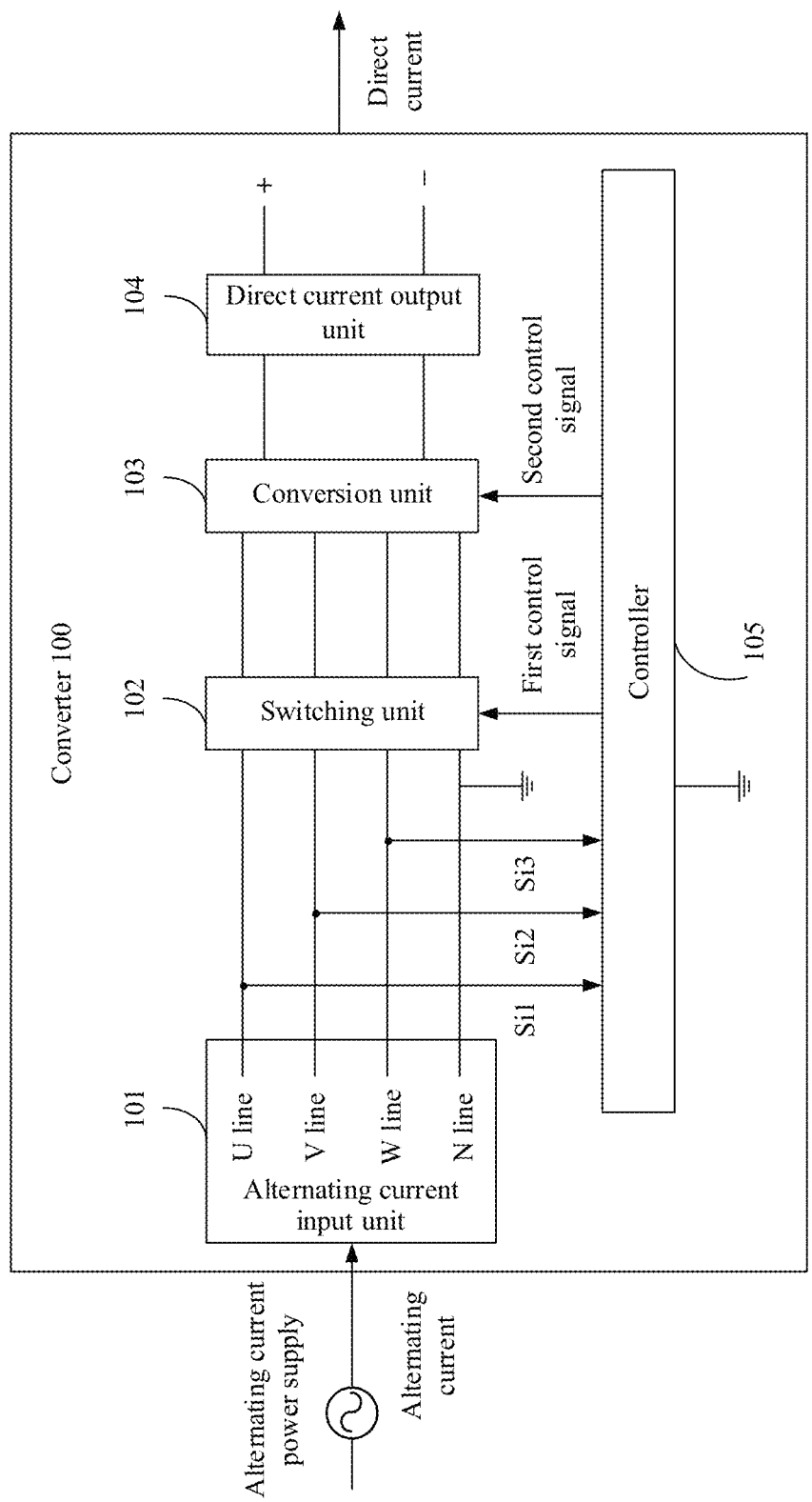
FIG. 1 is a first schematic structural diagram of a converter, according to some embodiments.

FIG. 1 is a first schematic structural diagram of a converter 100, according to some embodiments. As shown in FIG. 1, the converter 100 includes an alternating current input unit 101, a switching unit 102, a conversion unit 103, a direct current output unit 104, and a controller 105. An output end of the alternating current input unit 101 is connected to an input end of the switching unit 102, an output end of the switching unit 102 is connected to an input end of the conversion unit 103, and an output end of the conversion unit 103 is connected to an input end of the direct current output unit 104.

The alternating current input unit 101 is configured to input an alternating current to provide the alternating current for the conversion unit 103. The alternating current input unit 101 includes a U line, a V line, a W line, and/or an N line. The N line is connected to a ground of the controller 105. The U line, the V line, and the W line form a three-phase live line. The U line may also be referred to as an A phase. The V line may also be referred to as a B phase. The W line may also be referred to as a C phase. N is a neutral line, namely, a zero line. A voltage between the N line and any phase of the U line, the V line, and the W line is a phase voltage (for example, 220 V). A voltage between the U line, the V line, and the W line is a line voltage (for example, 380 V).

The controller 105 is configured to: collect a voltage of the U line by using a first sampling line Si1, collect a voltage of the V line by using a second sampling line Si2, and collect a voltage of the W line by using a third sampling line Si3; determine a first control signal based on the voltage of the U line, the voltage of the V line, and the voltage of the W line; and/or send the first control signal to the switching unit 102. The controller 105 is connected to the U line through the first sampling line Si1, the controller 105 is connected to the V line through the second sampling line Si2, and the controller 105 is connected to the W line through the third sampling line Si3.

The switching unit 102 is configured to control, based on the first control signal sent by the controller 105, the converter 100 to switch from a three-phase alternating current input circuit to a single-phase alternating current input circuit, to provide a single-phase alternating current for the conversion unit 103 through the single-phase alternating current input circuit.

The conversion unit 103 is configured to convert the alternating current into a direct current based on a second control signal sent by the controller 105. The second control signal is determined based on the voltage of the U line, the voltage of the V line, and the voltage of the W line that are collected by the controller 105, a current of the conversion unit 103, and a direct current voltage output by the direct current output unit 104.

The direct current output unit 104 is configured to: receive the direct current output by the conversion unit 103, and output the direct current, to supply power to a load (for example, an electric vehicle).

A negative electrode of a bus is used as a ground, and a controller needs to be connected to a U line, a V line, and a W through a differential circuit. In contrast, in the converter provided in this embodiment of this application, the N line is connected to the ground of the controller and is used as a sampling reference ground of the controller. In this way, the differential circuit can be removed, and the controller is separately connected to the U line, the V line, and the W line directly, to collect the voltage of the U line, the voltage of the V line, and the voltage of the W line. This can effectively simplify a three-phase voltage sampling circuit.

Figure 2:
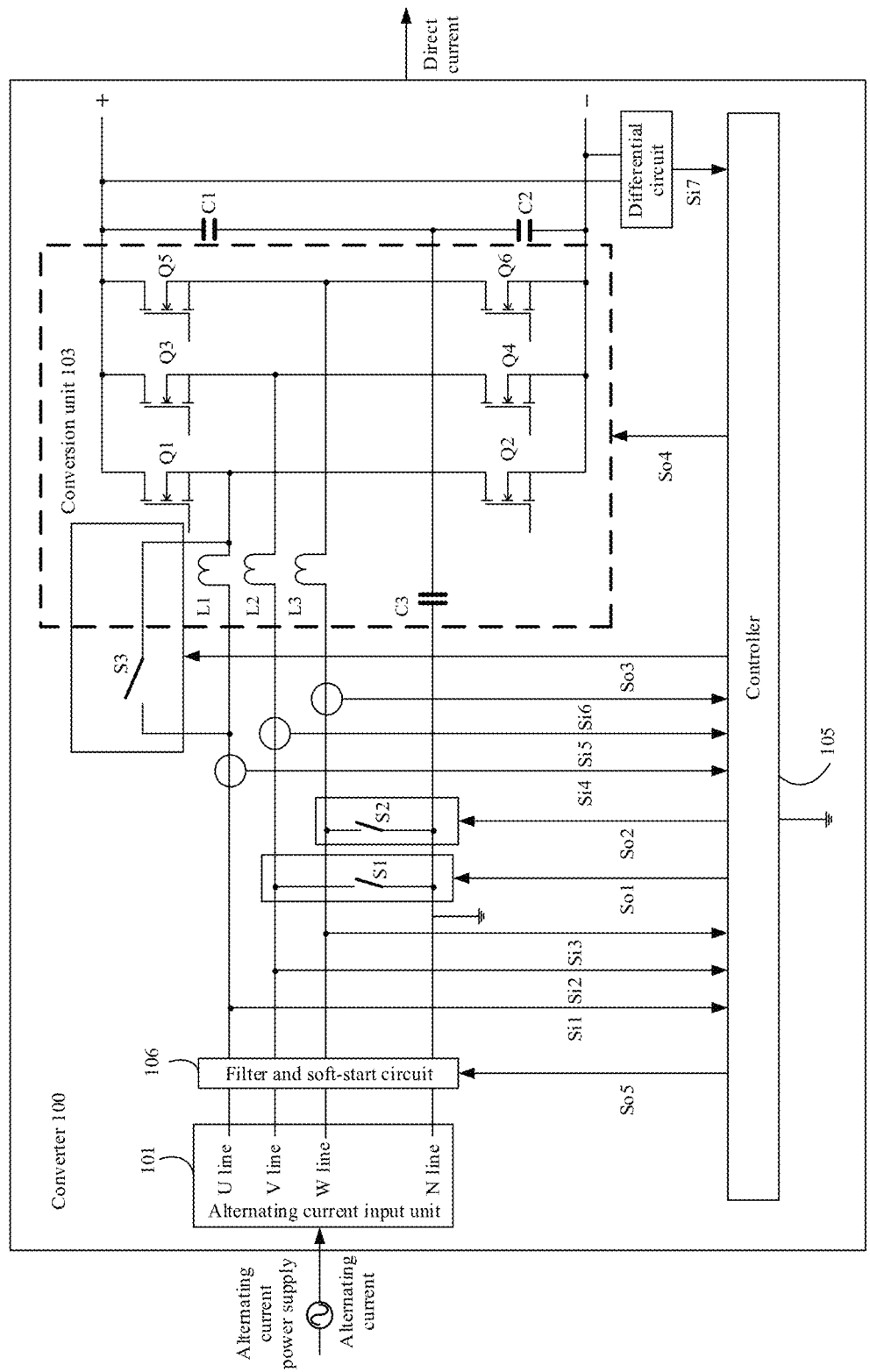
FIG. 2 is a second schematic structural diagram of a converter, according to some embodiments.

FIG. 2 is a second schematic structural diagram of a converter, according to some embodiments. As shown, the switching unit may include a first switch S1, a second switch S2, and a third switch S3. The first switch S1 is connected to the controller 105 through a first control circuit So1, the second switch S2 is connected to the controller 105 through a second control circuit So2, and the third switch S3 is connected to the controller 105 through a third control circuit So3.

When the voltage of the U line collected by the controller 105 is greater than 0 volts, and the voltages of the V line and the W line that are collected by the controller 105 are both equal to 0 volts, the controller 105 may determine that the converter inputs a single-phase alternating current. In some embodiments, the controller 105 sends the first control signal to the first switch S1 through the first control circuit So1, to control the first switch S1 to be closed; the controller 105 sends the first control signal to the second switch S2 through the second control circuit So2, to control the second switch S2 to be closed; and the controller 105 sends the first control signal to the third switch S3 through the third control circuit So3, to control the third switch S3 to be closed. In this way, when the converter inputs the single-phase alternating current, closing the first switch S1 and the second switch S2 enables phase power bridge arms of the V line and the W line to work in parallel, to fully utilize a power device, reduce losses of the switching transistors, and improve rectification efficiency; and closing the third switch S3 enables a bridge arm connected to the third switch S3 to work at a low frequency, to be compatible with a circuit structure of the conversion unit.

Further, the converter may include a first bus split capacitor C1 and a second bus split capacitor C2. A middle point between the first bus split capacitor C1 and the second bus split capacitor C2 is connected to the N line through a capacitor C3. A positive electrode of the first bus split capacitor C1 is connected to a positive electrode of a bus included in the direct current output unit 104, a negative electrode of the first bus split capacitor C1 is connected to a positive electrode of the second bus split capacitor C2, and a negative electrode of the second bus split capacitor C2 is connected to a negative electrode of the bus included in the direct current output unit 104. In this way, a high-frequency path can be provided, thereby reducing EMI. The EMI is an interference phenomenon that occurs when an electromagnetic wave interacts with an electronic component, and includes two types: conducted interference and radiated interference.

The conversion unit may include a first inductor L1, a second inductor L2, a third inductor L3, a first switching transistor Q1, a second switching transistor Q2, a third switching transistor Q3, a fourth switching transistor Q4, a fifth switching transistor Q5, and a sixth switching transistor Q6. One end of the first inductor L1 is connected to the U line, and the other end of the first inductor L1 is connected to a middle point of a bridge arm formed by connecting the first switching transistor Q1 and the second switching transistor Q2 in series. One end of the second inductor L2 is connected to the V line, and the other end of the second inductor L2 is connected to a middle point of a bridge arm formed by connecting the third switching transistor Q3 and the fourth switching transistor Q4 in series. One end of the third inductor L3 is connected to the W line, and the other end of the third inductor L3 is connected to a middle point of a bridge arm formed by connecting the fifth switching transistor Q5 and the sixth switching transistor Q6 in series. A drain of the first switching transistor Q1, a drain of the third switching transistor Q3, and a drain of the fifth switching transistor Q5 are all connected to the positive electrode of the bus included in the direct current output unit 104. A drain of the second switching transistor Q2, a drain of the fourth switching transistor Q4, and a source of the sixth switching transistor Q6 are all connected to the negative electrode of the bus included in the direct current output unit 104.

A switching transistor may be a power device. For example, the power device may be at least one of or a combination of different power devices of a metal-oxide-semiconductor field-effect transistor (MOSFET), an insulated gate bipolar transistor (IGBT), and an integrated gate-commutated thyristor (IGCT). An on/off state $B_k$ of each bridge arm is defined as follows:

$$B_k = \begin{cases} 0: \text{A lower transistor of the bridge arm is turned on, and an upper transistor is off.} \\ 1: \text{The upper transistor of the bridge arm is turned on, and the lower transistor is off.} \end{cases}$$

$$k = U, V, W$$

Herein, the upper transistor represents a switching transistor connected to the positive electrode of the bus included in the direct current output unit 104, and the lower transistor represents a switching transistor connected to the negative electrode of the bus included in the direct current output unit 104.

The switching transistors of each bridge arm are turned on/off according to a logical relationship of bridge arm on/off states listed in Table 1, to enable a bridge arm group to output different level signals.

TABLE 1

Logical relationship of bridge arm on/off states

| Bridge arm on/off states | | | | | | | |
|---|---|---|---|---|---|---|---|
| $B_U$ | 0 | 0 | 0 | 0 | 1 | 1 | 1 |
| $B_V$ | 0 | 0 | 1 | 1 | 0 | 0 | 1 |
| $B_W$ | 0 | 1 | 0 | 1 | 0 | 1 | 1 |

The controller 105 is further configured to: collect a current of the first inductor L1 by using a fourth sampling line Si4, collect a current of the second inductor L2 by using a fifth sampling line Si5, collect a current of the third inductor L3 by using a sixth sampling line Sib, and collect the direct current voltage by using a seventh sampling line Si7. In some embodiments, a differential circuit may further be included between the controller 105 and the direct current output unit 104. A direct current voltage is collected by using the differential circuit in a differential voltage division manner. The controller 105 is configured to determine the second control signal based on the current of the first inductor L1, the current of the second inductor L2, the current of the third inductor L3, the direct current voltage, the voltage of the U line, the voltage of the V line, and the voltage of the W line; and send the second control signal to the conversion unit 103 through a fourth control circuit So4, to control the conversion unit 103 to convert the alternating current (which is a three-phase alternating current or a single-phase alternating current) into a direct current. In this way, the N line is connected to the ground of the controller and is used as a sampling reference ground of the controller. Therefore, the controller can be separately connected to the U line, the V line, and the W line directly, to collect the current of the first inductor, the current of the second inductor, and the current of the third inductor. This simplifies a current sampling circuit of the conversion unit.

In some other embodiments, the first inductor L1, the second inductor L2, and the third inductor L3 are integrated inductors. Therefore, when the converter works in a three-phase alternating current rectified state, power frequency flux can be canceled and volumes of the inductors can be reduced.

In some other embodiments, the converter may further include a filter and soft-start circuit 106. The filter and soft-start circuit 106 includes components such as a capacitor, an inductor, a resistor, and a switch. The filter and soft-start circuit 106 is configured to: filter the alternating current based on a third control signal sent by the controller 105 through a fifth control circuit So5, and output a filtered alternating current. This avoids impact of a current on a conversion voltage.

Therefore, the converter shown in FIG. 2 may work in a charging mode in which electric energy is transmitted (e.g., delivered, provided, sent) from the alternating current input unit 101 to the direct current output unit 104, in other words, the electric energy is transmitted from an alternating current side to an electric vehicle side. The converter may work in a three-phase rectified charging state or a single-state rectified charging state under the control of the controller 105.

Figure 3:
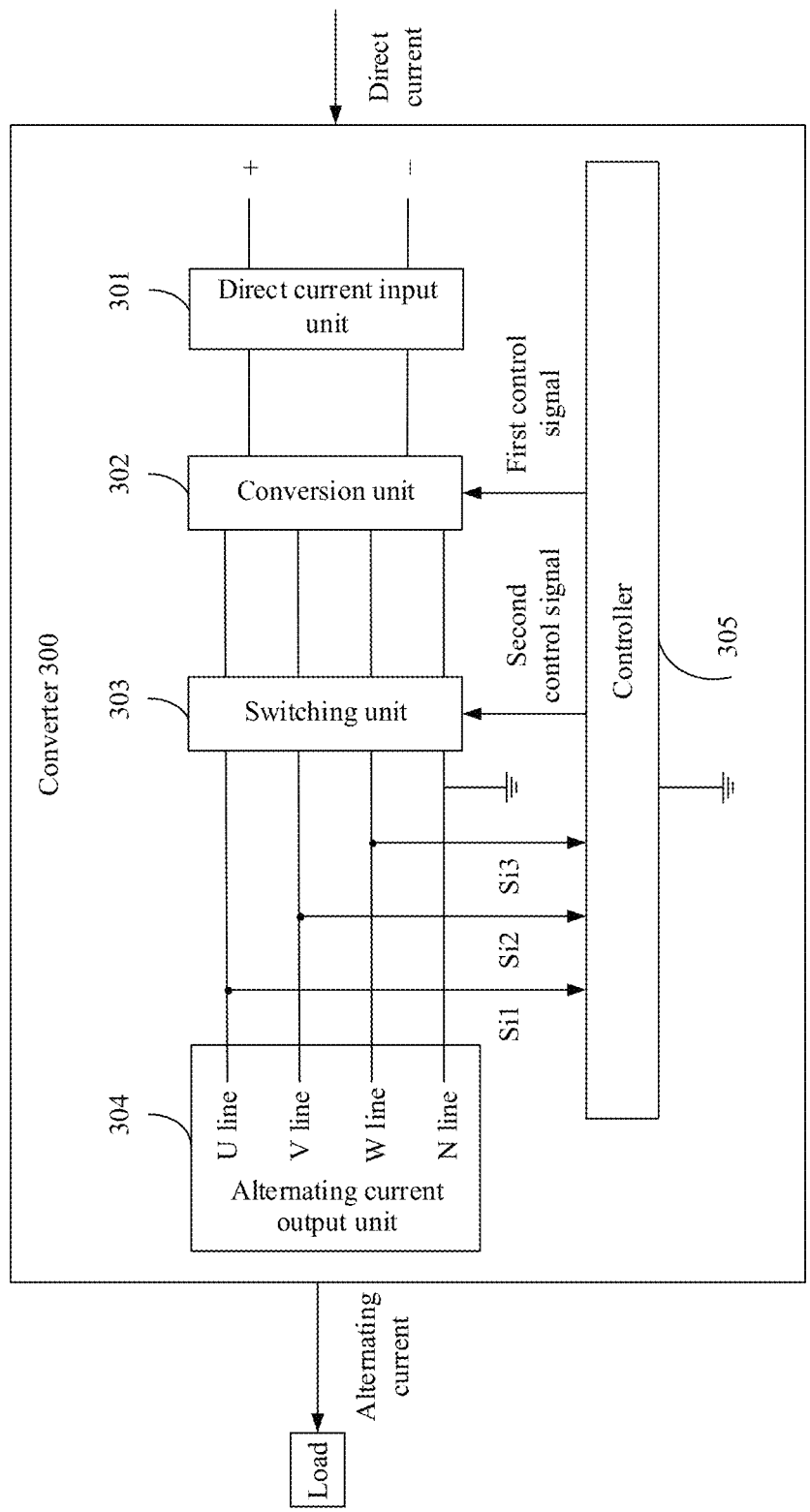
FIG. 3 is a third schematic structural diagram of a converter, according to some embodiments.

FIG. 3 is a third schematic structural diagram of a converter, according to some embodiments. As shown in FIG. 3, the converter 300 includes a direct current input unit 301, a conversion unit 302, a switching unit 303, an alternating current output unit 304, and a controller 305. An output end of the direct current input unit 301 is connected to an input end of the conversion unit 302, an output end of the conversion unit 302 is connected to an input end of the switching unit 303, and an output end of the switching unit 303 is connected to an input end of the alternating current output unit 304.

The direct current input unit 301 is configured to input a direct current to provide the direct current for the conversion unit 302.

The conversion unit 302 is configured to convert the direct current into an alternating current based on a first control signal sent by the controller 305. The first control signal is determined based on a voltage of a U line, a voltage of a V line, and a voltage of a W line that are collected by the controller, a current of the conversion unit, and a direct current voltage output by the direct current input unit 301.

The switching unit 303 is configured to control, based on a second control signal sent by the controller 305, the converter to switch from a three-phase alternating current output circuit to a single-phase alternating current output circuit, to provide a single-phase alternating current for the alternating current output unit 304 through the single-phase alternating current output circuit.

The alternating current output unit 304 is configured to: receive the alternating current output by the conversion unit 302, and output the alternating current. The alternating current output unit 304 includes the U line, the V line, the W line, and/or an N line. The N line is connected to a ground of the controller. The U line, the V line, and the W line form a three-phase live line. The U line may also be referred to as an A phase. The V line may also be referred to as a B phase. The W line may also be referred to as a C phase. N is a neutral line, namely, a zero line. A voltage between the N line and any phase of the U line, the V line, and the W line is a phase voltage (for example, 220 V). A voltage between the U line, the V line, and the W line is a line voltage (for example, 380 V).

The controller 305 is configured to: collect the voltage of the U line by using a first sampling line Si1, collect the voltage of the V line by using a second sampling line Si2, and collect the voltage of the W line by using a third sampling line Si3; determine the second control signal based on the voltage of the U line, the voltage of the V line, and the voltage of the W line; and send the second control signal to the switching unit 303. The controller 305 is connected to the U line through the first sampling line Si1, the controller 305 is connected to the V line through the second sampling line Si2, and the controller 305 is connected to the W line through the third sampling line Si3.

A negative electrode of a bus is used as a ground, and a controller needs to be connected to a U line, a V line, and a W through a differential circuit. In contrast, in the converter provided in this embodiment of this application, the N line is connected to the ground of the controller and is used as a sampling reference ground of the controller. In this way, the differential circuit can be removed, and the controller is separately connected to the U line, the V line, and the W line directly, to collect the voltage of the U line, the voltage of the V line, and the voltage of the W line. This can effectively simplify a three-phase voltage sampling circuit.

Figure 4:
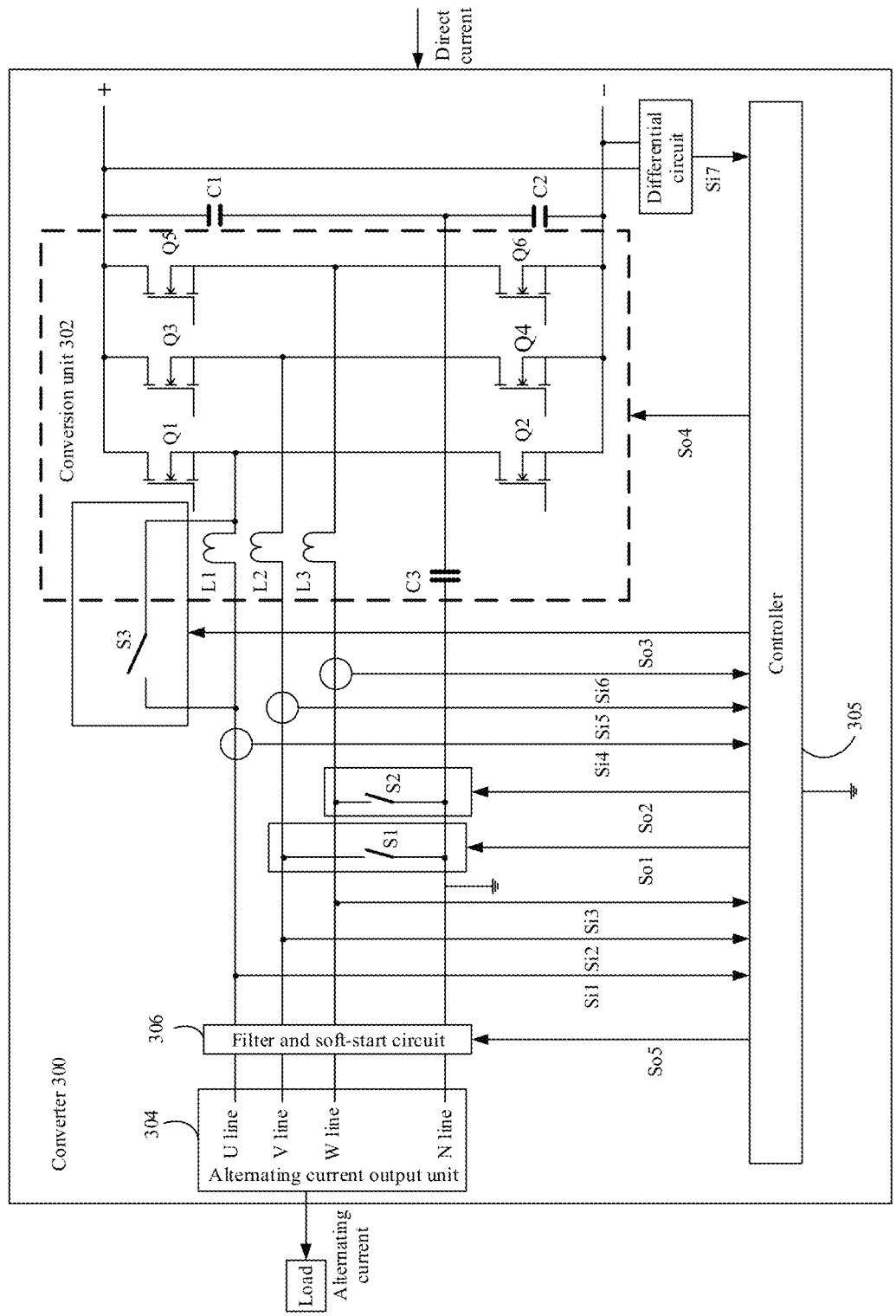
FIG. 4 is a fourth schematic structural diagram of a converter, according to some embodiments.

FIG. 4 is a fourth schematic structural diagram of a converter, according to some embodiments. The converter 300 further includes a filter and soft-start circuit 306. In this case, the converter may work in a discharging mode in which electric energy is transmitted from the direct current input unit to the alternating current output unit. In other words, the electric energy is transmitted from an electric vehicle side to an alternating current side. The converter may work in a three-phase inverted discharging state or a single-state inverted discharging state under the control of the controller. For example explanations, refer to the descriptions in the foregoing embodiments. Details are not described herein again.

Figure 5:
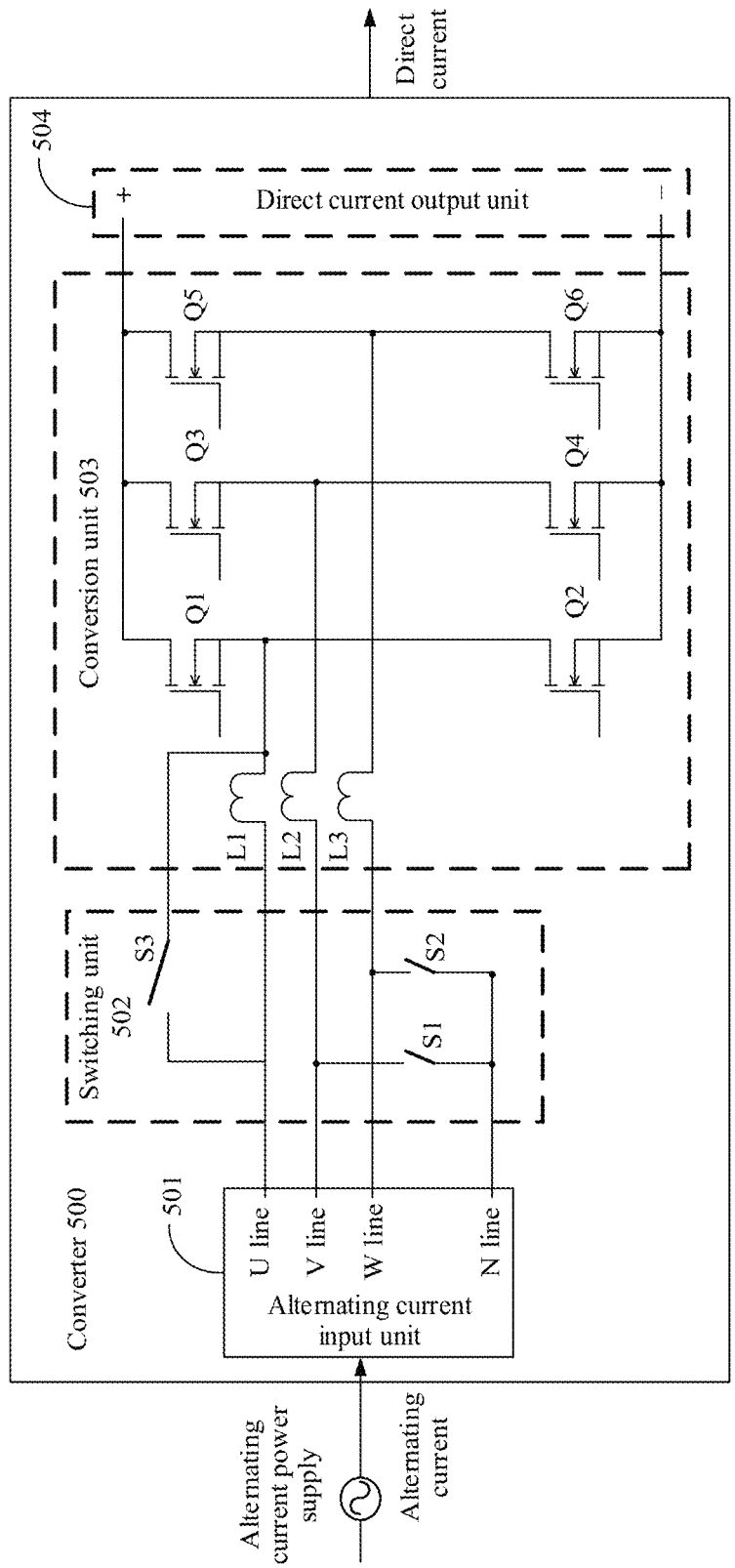
FIG. 5 is a fifth schematic structural diagram of a converter, according to some embodiments.

FIG. 5 is a fifth schematic structural diagram of a converter, according to some embodiments. As shown, the converter 500 includes an alternating current input unit 501, a switching unit 502, a conversion unit 503, and a direct current output unit 504. An output end of the alternating current input unit 501 is connected to an input end of the switching unit 502, an output end of the switching unit 502 is connected to an input end of the conversion unit 503, and an output end of the conversion unit 503 is connected to an input end of the direct current output unit 504.

The alternating current input unit 501 is configured to input an alternating current to provide the alternating current for the conversion unit 503. The alternating current input unit 501 includes a U line, a V line, a W line, and/or an N line.

The switching unit 502 is configured to switch the converter 500 from a three-phase alternating current input circuit to a single-phase alternating current input circuit.

The conversion unit 503 is configured to convert the alternating current into a direct current.

The direct current output unit 504 is configured to: receive the direct current output by the conversion unit 503, and output the direct current.

In some embodiments, the conversion unit 503 may include a first inductor L1, a second inductor L2, a third inductor L3, a first switching transistor Q1, a second switching transistor Q2, a third switching transistor Q3, a fourth switching transistor Q4, a fifth switching transistor Q5, and a sixth switching transistor Q6. One end of the first inductor L1 is connected to the U line, and the other end of the first inductor L1 is connected to a middle point of a bridge arm formed by connecting the first switching transistor Q1 and the second switching transistor Q2 in series. One end of the second inductor L2 is connected to the V line, and the other end of the second inductor L2 is connected to a middle point of a bridge arm formed by connecting the third switching transistor Q3 and the fourth switching transistor Q4 in series. One end of the third inductor L3 is connected to the W line, and the other end of the third inductor L3 is connected to a middle point of a bridge arm formed by connecting the fifth switching transistor Q5 and the sixth switching transistor Q6 in series. A drain of the first switching transistor Q1, a drain of the third switching transistor Q3, and a drain of the fifth switching transistor Q5 are all connected to a positive electrode of a bus included in the direct current output unit 504. A drain of the second switching transistor Q2, a drain of the fourth switching transistor Q4, and a source of the sixth switching transistor Q6 are all connected to a negative electrode of the bus included in the direct current output unit 504.

The switching unit 502 includes a first switch S1, a second switch S2, and a third switch S3. One end of the first switch S1 is connected to the V line, the other end of the first switch S1 is connected to the N line, one end of the second switch S2 is connected to the W line, the other end of the second switch S2 is connected to the N line, one end of the third switch S3 is connected to one end of the first inductor L1, and the other end of the third switch S3 is connected to the other end of the first inductor L1. When the first switch S1, the second switch S2, and the third switch S3 are all closed, the converter 500 is switched to the single-phase alternating current input circuit. In this way, when the converter inputs a single-phase alternating current, closing the first switch S1 and the second switch S2 enables phase power bridge arms of the V line and the W line to work in parallel, to fully utilize a power device, reduce losses of the switching transistors, and improve rectification efficiency; and closing the third switch S3 enables a bridge arm connected to the third switch S3 to work at a low frequency, to be compatible with a circuit structure of the conversion unit.

Under the control of a controller, the converter shown in FIG. 5 may work in a charging mode in which electric energy is transmitted from the alternating current input unit 501 to the direct current output unit 504. In other words, the electric energy is transmitted from an alternating current side to an electric vehicle side. The converter may work in a three-phase rectified charging state or a single-state rectified charging state under the control of the controller.

Figure 6:
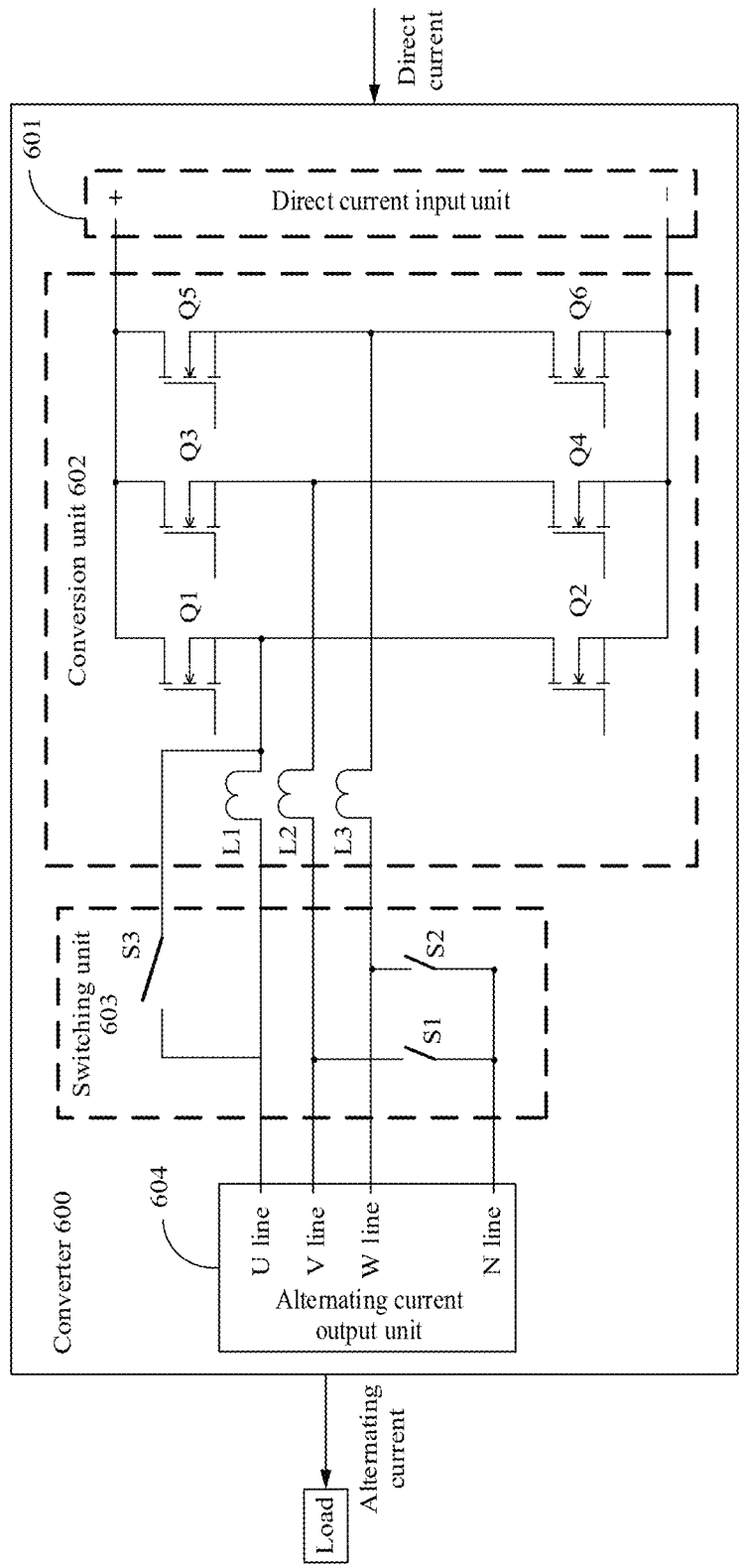
FIG. 6 is a sixth schematic structural diagram of a converter, according to some embodiments.

FIG. 6 is a sixth schematic structural diagram of a converter, according to some embodiments. As shown, the converter 600 includes a direct current input unit 601, a conversion unit 602, a switching unit 603, and an alternating current output unit 604. An output end of the direct current input unit 601 is connected to an input end of the conversion unit 602, an output end of the conversion unit 602 is connected to an input end of the switching unit 603, and an output end of the switching unit 603 is connected to an input end of the alternating current output unit 604.

The direct current input unit 601 is configured to input a direct current to provide the direct current for the conversion unit 602.

The conversion unit 602 is configured to convert the direct current into an alternating current.

The switching unit 603 is configured to switch the converter from a three-phase alternating current output circuit to a single-phase alternating current output circuit.

The alternating current output unit 604 is configured to: receive the alternating current output by the conversion unit 602, and output the alternating current. The alternating current output unit 604 includes a U line, a V line, a W line, and/or an N line.

The conversion unit 602 may include a first inductor L1, a second inductor L2, a third inductor L3, a first switching transistor Q1, a second switching transistor Q2, a third switching transistor Q3, a fourth switching transistor Q4, a fifth switching transistor Q5, and a sixth switching transistor Q6. One end of the first inductor L1 is connected to the U line, and the other end of the first inductor L1 is connected to a middle point of a bridge arm formed by connecting the first switching transistor Q1 and the second switching transistor Q2 in series. One end of the second inductor L2 is connected to the V line, and the other end of the second inductor L2 is connected to a middle point of a bridge arm formed by connecting the third switching transistor Q3 and the fourth switching transistor Q4 in series. One end of the third inductor L3 is connected to the W line, and the other end of the third inductor L3 is connected to a middle point of a bridge arm formed by connecting the fifth switching transistor Q5 and the sixth switching transistor Q6 in series. A drain of the first switching transistor Q1, a drain of the third switching transistor Q3, and a drain of the fifth switching transistor Q5 are all connected to a positive electrode of a bus included in the direct current input unit 601. A drain of the second switching transistor Q2, a drain of the fourth switching transistor Q4, and a source of the sixth switching transistor Q6 are all connected to a negative electrode of the bus included in the direct current input unit 601.

The switching unit 603 includes a first switch S1, a second switch S2, and a third switch S3. One end of the first switch S1 is connected to the V line, the other end of the first switch S1 is connected to the N line, one end of the second switch S2 is connected to the W line, the other end of the second switch S2 is connected to the N line, one end of the third switch S3 is connected to one end of the first inductor L1, and the other end of the third switch S3 is connected to the other end of the first inductor L1. When the first switch S1, the second switch S2, and the third switch S3 are all closed, the converter 600 is switched to the single-phase alternating current output circuit. In this way, when the converter outputs a single-phase alternating current, closing the first switch S1 and the second switch S2 enables phase power bridge arms of the V line and the W line to work in parallel, to fully utilize a power device, reduce losses of the switching transistors, and improve rectification efficiency; and closing the third switch S3 enables a bridge arm connected to the third switch S3 to work at a low frequency, to be compatible with a circuit structure of the conversion unit.

Under the control of a controller, the converter shown in FIG. 6 may work in a discharging mode in which electric energy is transmitted from the direct current input unit to the alternating current output unit. In other words, the electric energy is transmitted from an electric vehicle side to an alternating current side. The converter may work in a three-phase inverted discharging state or a single-state inverted discharging state under the control of the controller.

An embodiment of this application further provides a power supply system, including a load and a converter. The converter is configured to: convert an alternating current into a direct current, to provide the direct current for the load; or convert a direct current into an alternating current, to provide the alternating current for the load.

Figure 7:
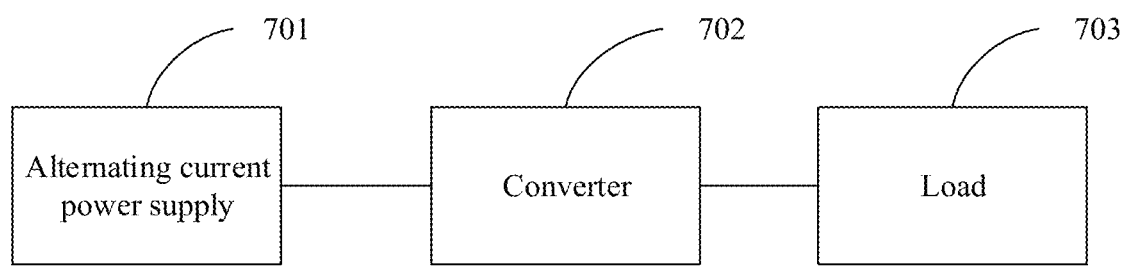
FIG. 7 is a first schematic diagram of a power supply system, according to some embodiments.

FIG. 7 is a first schematic diagram of a power supply system, according to some embodiments. As shown, it may be assumed that when the multi-level converter is configured to convert an alternating current into a direct current, the power supply system includes an alternating current power supply 701, a converter 702, and a load 703. The converter 702 is configured to convert an alternating current into a direct current, to provide the direct current for the load 703. An output end of the alternating current power supply 701 is connected to an alternating current input end of the converter 702, and a direct current output end of the converter 702 is connected to the load 703. The load 703 may be an electric vehicle. The converter 702 may be the converter shown in FIG. 2 or FIG. 5.

Figure 8:
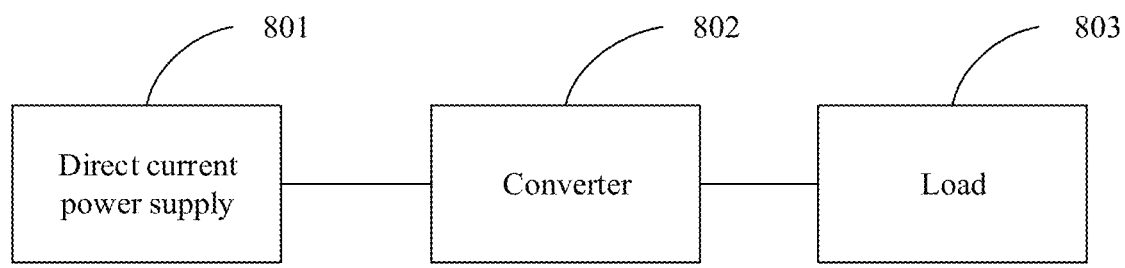
FIG. 8 is a second schematic diagram of a power supply system, according to some embodiments.

FIG. 8 is a second schematic diagram of a power supply system, according to some embodiments. As shown, it may be assumed that when the converter is configured to convert a direct current into an alternating current, the power supply system includes a direct current power supply 801, a converter 802, and a load 803. The converter 802 is configured to convert a direct current into an alternating current, to provide the alternating current for the load 803. An output end of the direct current power supply 801 is connected to a direct current input end of the converter 802, and an alternating current output end of the converter 802 is connected to the load 803. The direct current power supply 801 may be an electric vehicle. The converter 802 may be the converter shown in FIG. 4 or FIG. 6.

The foregoing descriptions are merely example implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A converter, comprising:
an alternating current input circuit, configured to input an alternating current to provide the alternating current for a conversion circuit, wherein the alternating current input circuit comprises a U line, a V line, a W line, and an N line, wherein the N line is connected to a ground of a controller, and an output end of the alternating current input circuit is connected to an input end of a switching circuit;
the controller, configured to: collect a voltage of the U line by using a first sampling line, collect a voltage of the V line by using a second sampling line, collect a voltage of the W line by using a third sampling line, determine a first control signal based on the voltage of the U line, the voltage of the V line, and the voltage of the W line, and send the first control signal to the switching circuit, wherein the controller is connected to the U line through the first sampling line, the controller is connected to the V line through the second sampling line, and the controller is connected to the W line through the third sampling line;
the switching circuit comprises a first switch, a second switch, and a third switch, a first end of the first switch is connected to the V line, a second end of the first switch is connected to the N line, a first end of the second switch is connected to the W line, a second end of the second switch is connected to the N line, a first end of the third switch is connected to a first end of a first inductor, and the second end of the third switch is connected to the second end of the first inductor, the first switch is configured to control, based on the first control signal sent by the controller, the first switch to be closed, the second switch is configured to control, based on the first control signal sent by the controller, the second switch to be closed, and the third switch is configured to control, based on the first control signal sent by the controller, the third switch to be closed, wherein the switching circuit is configured to control, based on the first control signal sent by the controller, the converter to switch from a three-phase alternating current input circuit to a single-phase alternating current input circuit, wherein an output end of the switching circuit is connected to an input end of the conversion circuit;
the conversion circuit, configured to convert the alternating current into a direct current based on a second control signal sent by the controller, wherein the second control signal is determined based on at least one of the voltage of the U line, the voltage of the V line, and the voltage of the W line that are collected by the controller, a current of the conversion circuit, or a direct current voltage output by a direct current output circuit, and an output end of the conversion circuit is connected to an input end of the direct current output circuit; and
the direct current output circuit, configured to receive the direct current output by the conversion circuit, and output the direct current.

2. The converter of claim 1, wherein the converter further comprises a first bus split capacitor and a second bus split capacitor, a middle point between the first bus split capacitor and the second bus split capacitor is connected to the N line through a capacitor, a positive electrode of the first bus split capacitor is connected to a positive electrode of a bus comprised in the direct current output circuit, a negative electrode of the first bus split capacitor is connected to a positive electrode of the second bus split capacitor, and a negative electrode of the second bus split capacitor is connected to a negative electrode of the bus comprised in the direct current output circuit.

3. The converter of claim 1, wherein the conversion circuit comprises the first inductor, a second inductor, a third inductor, a first switching transistor, a second switching transistor, a third switching transistor, a fourth switching transistor, a fifth switching transistor, and a sixth switching transistor, wherein the first end of the first inductor is connected to the U line, the second end of the first inductor is connected to a middle point of a bridge arm formed by connecting the first switching transistor and the second switching transistor in series, a first end of the second inductor is connected to the V line, a second end of the second inductor is connected to a middle point of a bridge arm formed by connecting the third switching transistor and the fourth switching transistor in series, a first end of the third inductor is connected to the W line, a second end of the third inductor is connected to a middle point of a bridge arm formed by connecting the fifth switching transistor and the sixth switching transistor in series, a drain of the first switching transistor, a drain of the third switching transistor, and a drain of the fifth switching transistor are all connected to the positive electrode of the bus comprised in the direct current output circuit, and a drain of the second switching transistor, a drain of the fourth switching transistor, and a source of the sixth switching transistor are all connected to the negative electrode of the bus comprised in the direct current output circuit.

4. The converter of claim 3, wherein the controller is further configured to: collect a current of the first inductor by using a fourth sampling line, collect a current of the second inductor by using a fifth sampling line, collect a current of the third inductor by using a sixth sampling line, collect the direct current voltage by using a seventh sampling line, determine the second control signal based on the current of the first inductor, the current of the second inductor, the current of the third inductor, the direct current voltage, the voltage of the U line, the voltage of the V line, and the voltage of the W line, and send the second control signal to the conversion circuit.

5. The converter of claim 3, wherein the first inductor, the second inductor, and the third inductor are integrated inductors.

6. A converter, comprising:
a direct current input circuit, configured to input a direct current to provide the direct current for a conversion circuit, wherein an output end of the direct current input circuit is connected to an input end of the conversion circuit;
the conversion circuit, configured to convert the direct current into an alternating current based on a first control signal sent by a controller, wherein the first control signal is determined based on at least one of a voltage of a U line, a voltage of a V line, and a voltage of a W line that are collected by the controller, a current of the conversion circuit, or a direct current voltage output by the direct current input circuit, wherein an output end of the conversion circuit is connected to an input end of a switching circuit;
the switching circuit comprises a first switch, a second switch, and a third switch, wherein a first end of the first switch is connected to the V line, a second end of the first switch is connected to the N line, a first end of the second switch is connected to the W line, a second end of the second switch is connected to the N line, a first end of the third switch is connected to a first end of a first inductor, and a second end of the third switch is connected to a second end of the first inductor, wherein the first switch is configured to control, based on a second control signal sent by the controller, the first switch to be closed, the second switch is configured to control, based on the second control signal sent by the controller, the second switch to be closed, and the third switch is configured to control, based on the second control signal sent by the controller, the third switch to be closed, wherein the switching circuit is configured to control, based on the second control signal sent by the controller, the converter to switch from a three-phase alternating current output circuit to a single-phase alternating current output circuit, wherein an output end of the switching circuit is connected to an input end of an alternating current output circuit; and
the alternating current output circuit, configured to: receive the alternating current output by the conversion circuit, and output the alternating current, wherein the alternating current output circuit comprises at least one of the U line, the V line, the W line, or an N line, wherein the N line is connected to a ground of the controller; and
the controller, configured to: collect the voltage of the U line by using a first sampling line, collect the voltage of the V line by using a second sampling line, collect the voltage of the W line by using a third sampling line, determine the second control signal based on the voltage of the U line, the voltage of the V line, and the voltage of the W line, and send the second control signal to the switching circuit, wherein the controller is connected to the U line through the first sampling line, the controller is connected to the V line through the second sampling line, and the controller is connected to the W line through the third sampling line.

7. The converter of claim 6, wherein the converter further comprises a first bus split capacitor and a second bus split capacitor, a middle point between the first bus split capacitor and the second bus split capacitor is connected to the N line through a capacitor, a positive electrode of the first bus split capacitor is connected to a positive electrode of a bus comprised in the direct current input circuit, a negative electrode of the first bus split capacitor is connected to a positive electrode of the second bus split capacitor, and a negative electrode of the second bus split capacitor is connected to a negative electrode of the bus comprised in the direct current input circuit.

8. The converter of claim 6, wherein the conversion circuit comprises the first inductor, a second inductor, a third inductor, a first switching transistor, a second switching transistor, a third switching transistor, a fourth switching transistor, a fifth switching transistor, and a sixth switching transistor, wherein the first end of the first inductor is connected to the U line, the second end of the first inductor is connected to a middle point of a bridge arm formed by connecting the first switching transistor and the second switching transistor in series, a first end of the second inductor is connected to the V line, a second end of the second inductor is connected to a middle point of a bridge arm formed by connecting the third switching transistor and the fourth switching transistor in series, a first end of the third inductor is connected to the W line, a second end of the third inductor is connected to a middle point of a bridge arm formed by connecting the fifth switching transistor and the sixth switching transistor in series, a drain of the first switching transistor, a drain of the third switching transistor, and a drain of the fifth switching transistor are all connected to the positive electrode of the bus comprised in the direct current input circuit, and a drain of the second switching transistor, a drain of the fourth switching transistor, and a source of the sixth switching transistor are all connected to the negative electrode of the bus comprised in the direct current input circuit.

9. The converter of claim 8, wherein the controller is further configured to: collect a current of the first inductor by using a fourth sampling line, collect a current of the second inductor by using a fifth sampling line, collect a current of the third inductor by using a sixth sampling line, collect the direct current voltage by using a seventh sampling line, determine the first control signal based on the current of the first inductor, the current of the second inductor, the current of the third inductor, the direct current voltage, the voltage of the U line, the voltage of the V line, and the voltage of the W line, and send the first control signal to the conversion circuit.

10. The converter of claim 8, wherein the first inductor, the second inductor, and the third inductor are integrated inductors.

11. A converter, comprising:
an alternating current input circuit, configured to input an alternating current to provide the alternating current for a conversion circuit, wherein the alternating current input circuit comprises a U line, a V line, a W line, and an N line, and an output end of the alternating current input circuit is connected to an input end of a switching circuit;
the switching circuit, configured to switch the converter from a three-phase alternating current input circuit to a single-phase alternating current input circuit, wherein an output end of the switching circuit is connected to an input end of the conversion circuit;
the conversion circuit, configured to convert the alternating current into a direct current, wherein an output end of the conversion circuit is connected to an input end of a direct current output circuit; and
the direct current output circuit, configured to: receive the direct current output by the conversion circuit, and output the direct current, wherein
the conversion circuit comprises a first inductor, a second inductor, a third inductor, a first switching transistor, a second switching transistor, a third switching transistor, a fourth switching transistor, a fifth switching transistor, and a sixth switching transistor, wherein one end of the first inductor is connected to the U line, the other end of the first inductor is connected to a middle point of a bridge arm formed by connecting the first switching transistor and the second switching transistor in series, one end of the second inductor is connected to the V line, the other end of the second inductor is connected to a middle point of a bridge arm formed by connecting the third switching transistor and the fourth switching transistor in series, one end of the third inductor is connected to the W line, the other end of the third inductor is connected to a middle point of a bridge arm formed by connecting the fifth switching transistor and the sixth switching transistor in series, a drain of the first switching transistor, a drain of the third switching transistor, and a drain of the fifth switching transistor are all connected to a positive electrode of a bus comprised in the direct current output circuit, and a drain of the second switching transistor, a drain of the fourth switching transistor, and a source of the sixth switching transistor are all connected to a negative electrode of the bus comprised in the direct current output circuit; and
the switching circuit comprises a first switch, a second switch, and a third switch, wherein one end of the first switch is connected to the V line, the other end of the first switch is connected to the N line, one end of the second switch is connected to the W line, the other end of the second switch is connected to the N line, one end of the third switch is connected to one end of the first inductor, and the other end of the third switch is connected to the other end of the first inductor; and
when the first switch, the second switch, and the third switch are all closed, the converter is switched to the single-phase alternating current input circuit.

12. A converter, comprising:
a direct current input circuit, configured to input a direct current to provide the direct current for a conversion circuit, wherein an output end of the direct current input circuit is connected to an input end of the conversion circuit;
the conversion circuit, configured to convert the direct current into an alternating current, wherein an output end of the conversion circuit is connected to an input end of a switching circuit;
the switching circuit, configured to switch the converter from a three-phase alternating current output circuit to a single-phase alternating current output circuit, wherein an output end of the switching circuit is connected to an input end of an alternating current output circuit; and
the alternating current output circuit, configured to: receive the alternating current output by the conversion circuit, and output the alternating current, wherein the alternating current output circuit comprises a U line, a V line, a W line, and an N line, wherein
the conversion circuit comprises a first inductor, a second inductor, a third inductor, a first switching transistor, a second switching transistor, a third switching transistor, a fourth switching transistor, a fifth switching transistor, and a sixth switching transistor, wherein one end of the first inductor is connected to the U line, the other end of the first inductor is connected to a middle point of a bridge arm formed by connecting the first switching transistor and the second switching transistor in series, one end of the second inductor is connected to the V line, the other end of the second inductor is connected to a middle point of a bridge arm formed by connecting the third switching transistor and the fourth switching transistor in series, one end of the third inductor is connected to the W line, the other end of the third inductor is connected to a middle point of a bridge arm formed by connecting the fifth switching transistor and the sixth switching transistor in series, a drain of the first switching transistor, a drain of the third switching transistor, and a drain of the fifth switching transistor are all connected to a positive electrode of a bus comprised in the direct current input circuit, and a drain of the second switching transistor, a drain of the fourth switching transistor, and a source of the sixth switching transistor are all connected to a negative electrode of the bus comprised in the direct current input circuit; and
the switching circuit comprises a first switch, a second switch, and a third switch, wherein one end of the first switch is connected to the V line, the other end of the first switch is connected to the N line, one end of the second switch is connected to the W line, the other end of the second switch is connected to the N line, one end of the third switch is connected to one end of the first inductor, and the other end of the third switch is connected to the other end of the first inductor; and when the first switch, the second switch, and the third switch are all closed, the converter is switched to the single-phase alternating current output circuit.

* * * * *